(12) United States Patent
Colorado et al.

(10) Patent No.: US 8,911,548 B2
(45) Date of Patent: Dec. 16, 2014

(54) CHEMICALLY BONDED CERAMICS BASED ON FLY ASH

(71) Applicant: The Regents of the University of California, Oakland, CA (US)

(72) Inventors: Henry A. Colorado, Willowbrook, IL (US); Jenn-Ming Yang, Encino, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/745,487

(22) Filed: Jan. 18, 2013

(65) Prior Publication Data

US 2013/0190165 A1 Jul. 25, 2013

Related U.S. Application Data

(60) Provisional application No. 61/589,038, filed on Jan. 20, 2012.

(51) Int. Cl.
*C04B 18/08* (2006.01)
*C04B 28/34* (2006.01)
*C04B 35/14* (2006.01)

(52) U.S. Cl.
CPC .............. *C04B 35/14* (2013.01); *C04B 28/342* (2013.01); *C04B 2201/20* (2013.01); *Y10S 106/01* (2013.01)
USPC ........................ 106/705; 106/DIG. 1; 264/333

(58) Field of Classification Search
USPC ............................... 106/705, DIG. 1; 264/333
See application file for complete search history.

(56) References Cited

U.S. PATENT DOCUMENTS

| | | | | |
|---|---|---|---|---|
| 3,625,723 | A | * | 12/1971 | Sicka ............................. 106/679 |
| 4,328,037 | A | * | 5/1982 | Demirel et al. ................ 106/705 |
| 4,997,484 | A | * | 3/1991 | Gravitt et al. ................. 106/708 |
| 5,645,518 | A | | 7/1997 | Wagh et al. |
| 5,830,815 | A | | 11/1998 | Wagh et al. |
| 5,846,894 | A | | 12/1998 | Singh et al. |
| 6,133,498 | A | | 10/2000 | Singh et al. |
| 6,153,809 | A | | 11/2000 | Singh et al. |
| 6,204,214 | B1 | | 3/2001 | Singh et al. |
| 6,498,119 | B2 | | 12/2002 | Wagh et al. |
| 6,518,212 | B1 | | 2/2003 | Wagh et al. |
| 6,569,263 | B2 | | 5/2003 | Brown et al. |
| 6,776,837 | B2 | | 8/2004 | Wagh et al. |
| 6,910,537 | B2 | | 6/2005 | Brown et al. |
| 7,001,860 | B2 | | 2/2006 | Wagh et al. |
| 7,083,672 | B2 | | 8/2006 | Wagh et al. |
| 7,160,383 | B2 | | 1/2007 | Wagh et al. |
| 7,294,291 | B2 | | 11/2007 | Wagh et al. |
| 7,312,171 | B2 | | 12/2007 | Wagh et al. |
| 7,402,542 | B2 | | 7/2008 | Wagh et al. |
| 7,438,755 | B2 | | 10/2008 | Wagh et al. |
| 7,461,696 | B2 | * | 12/2008 | Nguyen et al. ............. 166/280.2 |

OTHER PUBLICATIONS

Derwent-Acc-No. 1996-039847 (Patent Application of Talmy et al, published in 1995).*
Colorado, H. A., Daniel, C., Hiel, C., Hahn, H. T. and Yang, J. M. (2011) Mechanical Properties of Chemical Bonded Phosphate Ceramics with Fly Ash as Filler, in Advanced Processing and Manufacturing Technologies for Structural and Multifunctional Materials V: Ceramic Engineering and Science Proceedings, vol. 32 (eds T. Ohji, M. Singh, S. Widjaja and D. Singh), John Wiley & Sons, Inc., Hoboken, NJ, USA. doi: 10.1002/9781118095379.ch12.

* cited by examiner

*Primary Examiner* — Anthony J Green
(74) *Attorney, Agent, or Firm* — Foley & Lardner LLP; Cliff Z. Liu (57) ABSTRACT

Chemically bonded ceramics and manufacturing processes are described. In one aspect, a manufacturing process of a chemically bonded ceramic is carried out by: (1) combining an acidic liquid and Fly ash to form a mixture; and (2) curing the mixture to form the chemically bonded ceramic. The Fly ash corresponds to at least a majority by weight of solids combined with the acidic liquid to form the mixture.

13 Claims, 6 Drawing Sheets

CHEMICALLY BONDED CERAMICS BASED ON FLY ASH

CROSS-REFERENCE TO RELATED APPLICATION

This application claims the benefit of U.S. Provisional Application No. 61/589,038 filed on Jan. 20, 2012, the disclosure of which is incorporated herein by reference in its entirety.

FIELD OF THE INVENTION

The invention generally relates to ceramics and, more particularly, to chemically bonded ceramics based on Fly ash.

BACKGROUND

High temperature manufacturing processes contribute to global warming, and this contribution is particularly significant in the processing of cementitious and ceramic materials. Each year, coal burning power plants, steel factories, and similar facilities in the United States produce more than 125 million tons of waste, much of it Fly and bottom ash left from combustion. This quantity depends on the fuel type, raw ingredients used, and the energy efficiency of a cement plant.

Manufacturing of conventional ceramics typically involves high temperatures during at least part of a manufacturing process, which is undesirable because of increased cost and negative environmental impact. Sintered ceramics have been used for thousands of years by humans, and even today are the subject of intense research mainly at high temperatures. However, sintering can involve a significant amount of energy, and the process can be expensive at large manufacturing scales. An alternative to sintering is chemical bonding as in hydraulic cements, which allows these materials to be inexpensively manufactured in high volume production. Although sintered ceramics typically are expensive compared to hydraulic cements, ceramics in general can have higher mechanical strength, corrosion resistance, and temperature stability. It is desirable to develop materials that have properties in between sintered cements and hydraulic ceramics to fill the gap between these materials.

It is against this background that a need arose to develop the chemically bonded ceramics and manufacturing processes described herein.

SUMMARY

One aspect of this disclosure relates to a manufacturing process of a chemically bonded ceramic. In one embodiment, the manufacturing process includes: (1) combining an acidic liquid and Fly ash to form a mixture; and (2) curing the mixture to form the chemically bonded ceramic. The Fly ash corresponds to at least a majority by weight of solids combined with the acidic liquid to form the mixture.

In another embodiment, the manufacturing process includes: (1) forming an aqueous mixture including (i) an acid and water in a combined amount corresponding to 20% to 67% by weight of the aqueous mixture, and (ii) Fly ash in an amount corresponding to at least 90% of a remaining weight of the aqueous mixture; and (2) reacting the acid and the Fly ash in the aqueous mixture to form the chemically bonded ceramic.

Another aspect of this disclosure relates to a chemically bonded ceramic. In one embodiment, the chemically bonded ceramic includes: (1) a binding phase including brushite; and (2) Fly ash particles dispersed in the binding phase. A density of the chemically bonded ceramic is up to 2.2 g/cm$^3$, and a compressive strength of the chemically bonded ceramic is at least 3 MPa.

In another embodiment, the chemically bonded ceramic is formed by: (1) combining an acidic liquid and Fly ash to form a mixture; and (2) curing the mixture to form the chemically bonded ceramic. The Fly ash corresponds to at least a majority by weight of solids combined with the acidic liquid to form the mixture.

In a further embodiment, the chemically bonded ceramic is formed by: (1) forming an aqueous mixture including (i) an acid and water in a combined amount corresponding to 20% to 67% by weight of the aqueous mixture, and (ii) Fly ash in an amount corresponding to at least 90% of a remaining weight of the aqueous mixture; and (2) reacting the acid and the Fly ash in the aqueous mixture to form the chemically bonded ceramic.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Definitions

The following definitions apply to some of the aspects described with respect to some embodiments of this disclosure. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable characteristics that are substantially the same as those of the non-spherical object. Thus, for example, a size of a non-spherical object can refer to a diameter of a corresponding spherical object that exhibits light scattering characteristics that are substantially the same as those of the non-spherical object. Alternatively, or in conjunction, a size of a non-spherical object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

Chemically Bonded Ceramics

Embodiments of this disclosure relate to chemically bonded ceramics (CBCs), which can combine thermomechanical properties of sintered ceramics with the ease of manufacturing of hydraulic cements. CBCs are desirable for a number of applications, such as radioactive and hazardous waste treatment (e.g., nuclear waste solidification and encapsulation), shielding different types of radiation, dental cements, patch repair material, bone tissue engineering, high temperature applications, composites with fillers and reinforcements, electronic materials, tooling for advanced composites, and coatings on nanotube and nanowire applications.

CBCs correspond to a class of ceramics that are formed through acid-base and hydration reactions. CBCs typically reach their resulting mechanical properties by chemical reactions at low temperatures, rather than sintering at elevated temperatures as in conventional ceramics. CBCs can bridge the gap between properties of sintered ceramics and hydraulic cements. Advantageously, CBCs can have mechanical properties that are comparable to sintered ceramics along with high stability in acidic and high temperature environments. In addition, manufacturing of CBCs can be inexpensive, castable, and environmentally friendly.

Chemically bonded phosphate ceramics (CBPCs) belong to the broader class of CBCs. CBPCs typically form by acid-base reactions between an acid, such as a phosphate-based acid (e.g., phosphoric acid), and a ceramic source, such as one including a metal oxide (e.g., alkaline metal oxide). In the case of CBPCs, when an acidic liquid, such as an aqueous phosphoric acid solution, and a metal oxide are mixed, the oxide dissolves, and an acid-base reaction is initiated. The result is a mixture in the form of a slurry that hardens into a ceramic product. Bonding in CBPCs can include a mixture of ionic, covalent, and van der Waals bonding, with the ionic and covalent bonding dominating in some embodiments. In contrast for the case of conventional cement hydration products, van der Waals and hydrogen bonding typically dominate.

A CBPC of some embodiments of this disclosure is formed using Fly ash as a primary or sole source of the ceramic itself, which represents a significant decrease in costs and weight not only with respect to conventional ceramics and cements, but also with respect to other CBPCs and CBCs. By incorporating Fly ash as the primary or sole ceramic source (rather than as a reinforcement or filler), CBPCs based on Fly ash can incorporate higher amounts of waste ashes, which themselves are a source of contamination, thus reducing their impact on the environment. In conjunction, CBPCs based on Fly ash can exhibit excellent mechanical properties, including compression strengths superior to those of a conventional cement, which allows the CBPCs to be used as a substitute for cementitious materials. Additionally, a density of CBPCs based on Fly ash can be lower than a conventional cement, thereby opening up a number of applications where a combination of high strength and low weight is desirable, such as those related to infrastructure repair in roads, bridges, and pipes, as well as other structural applications such as ceramic composite firewalls, towers, turbines, and aerospace applications.

According to some embodiments of this disclosure, manufacturing of a CBPC is carried out by forming an aqueous mixture including an acid, water, and Fly ash. In some embodiments, the acid and water are introduced in a combined amount corresponding to about 10% to about 80% by weight of the aqueous mixture, such as from about 20% to about 67%, from about 20% to about 33%, from about 33% to about 50%, from about 50% to about 60%, or from about 60% to about 67% by weight of the aqueous mixture. In some embodiments, the Fly ash is introduced in an amount corresponding to at least a majority of a remaining weight of the aqueous mixture, such as at least about 60%, at least about 70%, at least about 80%, at least about 90%, at least about 95%, or at least about 98%, and up to about 99%, up to about 99.5%, up to about 99.9%, or up to about 100% of the remaining weight of the aqueous mixture.

As part of forming the aqueous mixture, the acid can be introduced in a liquid form, such as an acidic liquid. Specifically, an aqueous solution of the acid is provided, and the aqueous solution of the acid is combined with the Fly ash to form the aqueous mixture. In some embodiments, the Fly ash corresponds to at least a majority by weight of all solids combined with the aqueous solution to form the aqueous mixture, such as at least about 60%, at least about 70%, at least about 80%, at least about 90%, at least about 95%, or at least about 98%, and up to about 99%, up to about 99.5%, up to about 99.9%, or up to about 100% by weight of all solids combined with the aqueous solution. In some embodiments, the aqueous solution of the acid and the Fly ash are combined in a weight ratio in a range of about 0.1:1 to about 4:1, such as from about 0.25:1 to about 2:1, from about 0.25:1 to about 0.5:1, from about 0.5:1 to about 1:1, from about 1:1 to about 1.5:1, or from about 1.5:1 to about 2:1. Examples of suitable acids include phosphate-based acids, such as phosphoric acid ($H_3PO_4$). In the case of an aqueous phosphoric acid solution, a concentration of phosphoric acid can be in a range of about 0.1% to about 50% by weight of the aqueous phosphoric acid solution, such as from about 0.1% to about 10%, from about 10% to about 20%, from about 20% to about 30%, from about 30% to about 40%, or from about 40% to about 50% by weight of the aqueous phosphoric acid solution. Other acidic liquids also are contemplated.

In other embodiments of forming the aqueous mixture, the acid can be introduced in a solid form, such as a powder. Specifically, the acid in a powdered form, the Fly ash, and water are combined in any suitable order to form the aqueous mixture. Examples of suitable acids in a powdered form include phosphate-based salts, such as phosphoric acid, alkali metal phosphates, and aluminum dihydrogen phosphate.

The Fly ash can include Class F Fly ash, Class C Fly ash, or a combination of both. Fly ash particles can be generally spherical in shape, and can have sizes in a range of about 0.5 μm to about 300 μm. Typically, quartz ($SiO_2$), alumina ($Al_2O_3$), hematite ($Fe_2O_3$), lime (CaO), and periclase (MgO) are the main chemical components present in Fly ash. Since Fly ash is a waste material, significant cost savings can be attained by using Fly ash as the primary or sole ceramic source. Also, since Fly ash particles can be hollow or porous, significant reductions in resulting density or weight can be attained. It is contemplated that any Fly ash can be used after process conditions are optimized. Other waste ashes (e.g., other waste ashes with an alkaline pH) can be used in place of, or in combination with, Fly ash.

Additional components can be introduced in the aqueous mixture. For example, additives such as periclase, borax ($Na_2B_4O_7 \cdot OH_2O$), boric acid ($H_3BO_3$), Wollastonite (Ca-$SiO_3$), and others can be introduced to modify resulting properties and to control setting time. One or more of these additives can be introduced in a combined amount up to about 2% or up to about 1% by weight of the aqueous mixture.

As part of forming the aqueous mixture, the various components are combined using any suitable mixing or agitation mechanism. In some embodiments, a suitable mixing time varies according to an amount of the Fly ash introduced in the aqueous mixture, with a higher amount of the Fly ash translating into a shorter mixing time, and a smaller amount of the Fly ash translating into a longer mixing time. For example, the mixing time can vary in a range of about 10 sec to about 10 min, with a lower portion of this range for the case when the aqueous mixture includes about 80% by weight of the Fly ash (e.g., acidic liquid to Fly ash ratio of about 0.25:1), and with an upper portion of this range for the case when the aqueous mixture includes about 33% by weight of the Fly ash (e.g., acidic liquid to Fly ash ratio of about 2:1).

Once formed, the aqueous mixture is cured to form a resulting CBPC product. Curing can be carried out at moderate temperatures that are significantly lower than sintering processes used for conventional ceramics. In some embodiments, curing is carried out at a temperature up to about 150° C., such as up to about 120° C., up to about 110° C., up to about 100° C., up to about 90° C., up to about 80° C., up to about 70° C., up to about 60° C., or up to about 50° C., and down to about room temperature or somewhat below room temperature. In some embodiments, a suitable curing or setting time varies according to an amount of the Fly ash introduced in the aqueous mixture, with a higher amount of the Fly ash translating into a shorter setting time, and a smaller amount of the Fly ash translating into a longer setting time. For example, the setting time can vary in a range of about 10 sec to about 10 min, with a lower portion of this range for the case when the aqueous mixture includes about 80% by weight of the Fly ash (e.g., acidic liquid to Fly ash ratio of about 0.25:1), and with an upper portion of this range for the case when the aqueous mixture includes about 33% by weight of the Fly ash (e.g., acidic liquid to Fly ash ratio of about 2:1).

As part of curing, the acid reacts with the Fly ash in the aqueous mixture to form the CBPC product. The resulting CBPC product includes a binding phase, which can be amorphous, crystalline, or both, and Fly ash particles bonded and dispersed in the binding phase. The binding phase serves as a ceramic matrix, and is formed as a result of acid-base reactions between phosphoric acid and chemical components present in Fly ash. The Fly ash particles correspond to residual particles remaining from the acid-base reactions.

In some embodiments, the binding phase of the CBPC product includes one or more phosphate phases. The amount and types of phases formed and their interrelation in properties of the CBPC product can be controlled, and the CBPC product can be used for different applications involving specific chemistry, pH, and different properties.

An example of a phosphate phase is brushite ($CaHPO_4 \cdot 2H_2O$), which can be formed based on the following reactions at a pH of about 10.4:

$$3CaO(s) + 2H_3PO_4(aq) \rightarrow Ca_3(PO_4)_2(aq) + 3H_2O(l)$$

$$Ca_3(PO_4)_2 + 6H_2O \rightarrow 2CaHPO_4 \cdot 2H_2O + Ca(OH)_2$$

Another example of a phosphate phase is aluminum phosphate ($AlPO_4$), which can be formed based on the following reactions at a pH of about 7:

$$Al_6Si_2O_{13} \rightarrow 3Al_2O_3 + 2SiO_2$$

$$Al_2O_3 + 2H_3PO_4 \rightarrow 2AlPO_4 + 3H_2O$$

Yet another example of a phosphate phase is iron monohydrogen phosphate ($FeHPO_4$), which can be formed based on the following reactions at a pH of about 7.8:

$$3Fe_2O_3 + 2H \rightarrow 2Fe_3O_4 + H_2O$$

$$Fe_2O_3 + Fe + 3H_3PO_4 \rightarrow 3FeHPO + 3H_2O$$

A further example of a phosphate phase is magnesium phosphate ($Mg_3(PO_4)_2$), which can be formed based on the following reaction at a pH of about 12.4:

$$MgO + H_3PO_4 \rightarrow Mg_3(PO4)_2 + H_2O$$

Resulting properties of the CBPC product can be tuned or controlled by selection over the origin, particle size, and other properties of the Fly ash (and other starting ingredients) as well as selection over manufacturing conditions, such as mixing time, setting time, and acidic liquid to Fly ash ratio.

In some embodiments, the CBPC product is a low density material, with a density up to about 2.2 g/cm$^3$, such as up to about 2.1 g/cm$^3$, up to about 2 g/cm$^3$, up to about 1.9 g/cm$^3$, up to about 1.8 g/cm$^3$, up to about 1.7 g/cm$^3$, up to about 1.6 g/cm$^3$, or up to about 1.5 g/cm$^3$, and down to about 1.4 g/cm$^3$, down to about 1.3 g/cm$^3$, down to about 1.2 g/cm$^3$, or less. In some embodiments, a resulting density varies according to an amount of the Fly ash introduced in the aqueous mixture during manufacturing, with a higher amount of the Fly ash translating into a smaller density, and a smaller amount of the Fly ash translating into a higher density. For example, the density can vary in a range from about 1.4 g/cm$^3$ to about 2.2 g/cm$^3$, with a lower portion of this range for the case when the aqueous mixture includes about 67% by weight of the Fly ash (e.g., acidic liquid to Fly ash ratio of about 0.5:1), and with an upper portion of this range for the case when the aqueous mixture includes about 33% by weight of the Fly ash (e.g., acidic liquid to Fly ash ratio of about 2:1). A similar trend can be attained in terms of a porosity of the CBPC product, with a higher amount of the Fly ash translating into a greater porosity, and a smaller amount of the Fly ash translating into a lower porosity. For example, a porosity can be in a range of about 0.1% to about 40%, such as from about 0.1% to about 5%, from about 5% to about 10%, from about 10% to about 15%, from about 15% to about 20%, from about 20% to about 25%, from about 25% to about 30%, from about 30% to about 35%, or from about 35% to about 40%.

In some embodiments, the CBPC product is a high strength material, with a compressive strength of at least about 3 MPa, such as at least about 5 MPa, at least about 7 MPa, at least about 10 MPa, at least about 12 MPa, at least about 15 MPa, or at least about 20 MPa, and up to about 40 MPa, up to about 45 MPa, up to about 100 MPa, or more. In some embodiments, a resulting compressive strength varies according to an amount of the Fly ash introduced in the aqueous mixture during manufacturing, with a higher amount of the Fly ash translating into a smaller compressive strength, and a smaller amount of the Fly ash translating into a higher compressive strength. For example, the compressive strength can vary in a range of about 20 MPa to about 40 MPa, with a lower portion of this range for the case when the aqueous mixture includes about 67% by weight of the Fly ash (e.g., acidic liquid to Fly ash ratio of about 0.5:1), and with an upper portion of this range for the case when the aqueous mixture includes about 33% by weight of the Fly ash (e.g., acidic liquid to Fly ash ratio of about 2:1).

Figure 1:
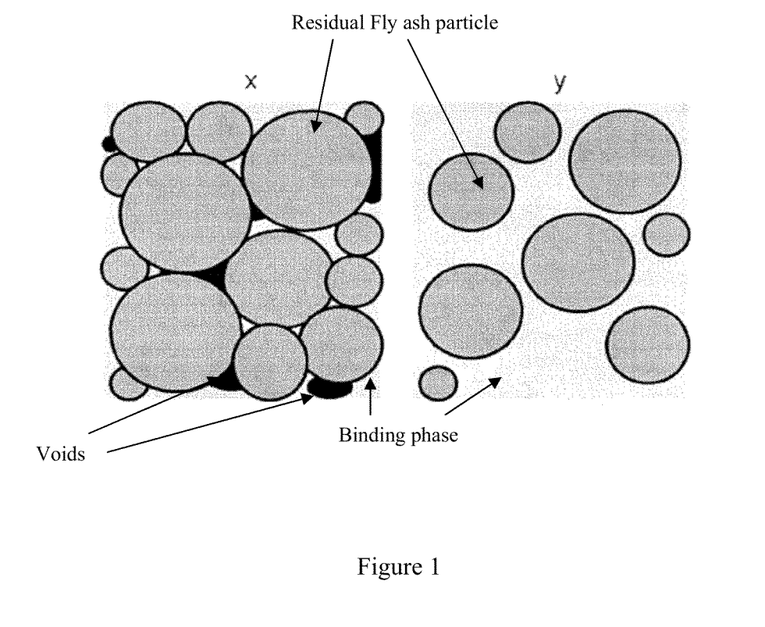
FIG. 1: Two example configurations of a chemically bonded phosphate ceramic based on Fly ash (labeled as "x" and "y").

FIG. 1 shows two example configurations of a CBPC product (labeled as "x" and "y"). In the "x" configuration, a lower acidic liquid to Fly ash ratio is used during manufacturing, yielding a lower density material with a higher concentration of residual Fly ash particles and a higher concentration of voids resulting from incomplete reaction with the Fly ash particles and the absence of a binding phase at those voids. In the "y" configuration, a higher acidic liquid to Fly ash ratio is used during manufacturing, yielding a higher density material with a lower concentration of residual Fly ash particles and a lower concentration of voids.

Applications of Chemically Bonded Ceramics

CBCs described herein are desirable for a number of applications, such as:

1) Fire resistant and retardant coatings for wood and other materials: Thermal properties of the CBCs can be similar to Fly ash, which is used as a primary or sole ceramic source. Since Fly ash can be composed of hollow particles, the CBCs can provide effective thermal insulation. Also, since the pH can be controlled to about neutral, inexpensive E-glass fibers can be used, unlike conventional hydraulic cement where acid resistant glass fibers typically are used. Other fibers also can be readily incorporated to produce high performance beams.

2) Alternative materials as a replacement of gypsum in building applications, with improved fire resistant properties.

3) Composite micro and nano capacitors: Hollow, microparticles in a ceramic matrix can yield good dielectric properties.

4) Storage of nuclear wastes (e.g., immobilization of wastes and the consolidation of a solid material): Since the CBCs can be formed by chemical reactions, both the pH and final chemical composition can be tailored according to a nuclear waste to be treated.

5) High temperature resistant paint that can be applied as a liquid: Liquid application is facilitated since the CBCs can be formed from a liquid mixture that later solidifies into a hard ceramic product. With inclusion of proper additives, a setting time can be extended from minutes to hours.

6) Semi-transparent porous glass applications (e.g., can be tailored as a glassy, porous material obtained at room temperature): Different colors are possible, such as by incorporating suitable pigments.

7) Aerospace applications involving materials with superior fire resistant properties and low density.

Example

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Experimental

The manufacturing of CBPC samples was conducted by mixing an aqueous phosphoric acid solution, Fly ash, and in some cases Wollastonite as a reinforcement. The composition of Fly ash (from Diversified Minerals Inc.) and Wollastonite (M200 powder from Minera Nyco) are presented in Tables 1 and 2 respectively.

TABLE 1

Chemical composition range of Fly ash class F (weight %)

| Composition | CaO | $SiO_2$ | $Fe_2O_3$ | $Al_2O_3$ |
|---|---|---|---|---|
| Percentage | 5-22 | 59-63 | 2-5 | 11-15 |

TABLE 2

Chemical composition range of Wollastonite powder (weight %)

| Composition | | | | | | | |
|---|---|---|---|---|---|---|---|
| CaO | $SiO_2$ | $Fe_2O_3$ | $Al_2O_3$ | MnO | MgO | $TiO_2$ | $K_2O$ |
| 46.25 | 52.00 | 0.25 | 0.40 | 0.025 | 0.50 | 0.025 | 0.15 |

(Percentage)

For pH tests, pH paper was used. Samples were ground in an alumina mortar as fine as for X-Ray Diffraction (XRD) powder analysis. Next, about 0.55 g of powder was stirred in a beaker with about 300 mL of water, and then pH was measured. The pH of the CBPC samples after curing was near neutral in all cases, which allows CBPCs to be reinforced with a variety of materials, such as E-glass fibers.

For compression tests, samples with weight ratios of 2.0, 1.5, 1.0, and 0.5 phosphoric acid solution to Fly ash were formed. In addition, samples with Wollastonite ($CaSiO_3$) contents were formed to evaluate its effect on mechanical properties.

A Teflon® fluoropolymer mold with mold release (Synlube 1000 silicone-based release agent applied before mixture discharge) was used to reduce the adhesion of the CBPC to the mold. Next, the mold with the CBPC was covered with plastic foil to reduce exposure to humidity and decrease shrinkage effects. Samples were released after about 48 hours and then dried at room temperature in open air for at least 3 days. Samples were then mechanically polished with substantially parallel and smooth faces (top and bottom) for compression tests. Since the CBPC has both unbonded and bonded water, samples were dried slowly in a furnace in order to reduce residual stresses, initially at about 50° C. for 1 day, followed by about 105° C. for an additional day.

Compression tests were conducted in an Instron® machine 3382. Also, the effect of mixing time on the compression strength was evaluated. A set of 20 samples was tested for each powder. The crosshead speed was about 1 mm/min.

To evaluate the microstructure, sample sections were ground using silicon carbide papers of 500, 1000, 2400, and 4000 grit progressively. After polishing, samples were dried in a furnace at about 70° C. for about 4 hours. Next, samples were mounted on an aluminum stub and sputtered in a Hummer 6.2 system (about 15 mA AC for about 30 sec), creating an about 1 nm thick film of gold. A Scanning Electron Microscope (SEM) used was a JEOL JSM 6700R in a high vacuum mode. Elemental distribution X-ray maps were collected on the SEM equipped with an Energy-Dispersive Analyzer (SEM-EDS). Images were collected on the polished and gold coated samples, with a counting time of about 51.2 ms/pixel.

XRD experiments were conducted using X'Pert PRO equipment (Cu K$\alpha$ radiation, $\lambda$=1.5406 Å) at about 45 KV and scanning between about 10° and about 70°. Samples were ground in an alumina mortar, and XRD tests were conducted at room temperature.

For density tests, samples were tested after a drying process (about 50° C. for 1 day, followed by about 100° C. for 1 day) in a Metter Toledo™ balance, by way of the buoyancy method. Six samples for each composition were tested. The Dry Weight (Wd), Submerged Weight (Ws), and Saturated Weight (Wss) were measured. The following parameters were calculated: Bulk volume: Vb=Wss−Ws; Apparent volume: Vapp=Wd−Ws; Open-pore volume: Vop=Wss−Wd; % porosity=(Vop/Vb)×100%; Bulk Density: Db=Wd/(Wss−Ws); and Apparent Density: Da=Wd/(Wd−Ws). In these calculations, the density of water was taken to be 1.0 g/cm$^3$.

Results:

The pH results for 2.0, 1.5, 1.0 and 0.5 phosphoric acid solution to Fly ash were respectively 7, 6, 5, and 7. For all samples with CaSiO$_3$ contents, the pH was 7.

Figure 2:
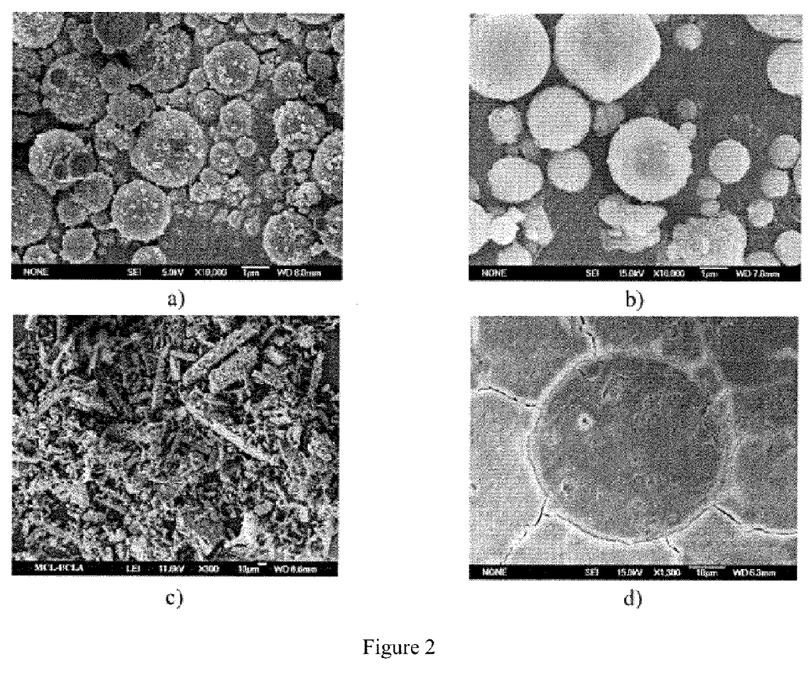
FIG. 2: Scanning Electron Microscope (SEM) images of a) Fly ash Class C, b) Fly ash Class F, c) CaSiO$_3$, and d) chemically bonded phosphate ceramic based on Fly ash.

FIG. 2 shows SEM images of Fly ash (Class C and Class F), CaSiO$_3$, and CBPC based on Fly ash.

Some properties of the materials presented above are summarized in Table 3. As the acidic solution to Fly ash ratio increases, obtained values for compressive strength and density were found to increase. Projected compressive strength values that can be further improved are also presented in Table 3.

TABLE 3

Properties of ceramics based on Fly ash without reinforcement

| Acidic formulation to Fly Ash ratio | Compressive strength [MPa] | Density [g/cm$^3$] | Compressive strength goal [MPa] |
| --- | --- | --- | --- |
| 2.0 | 12.6 | 2.2 | 40 |
| 1.5 | 7.0 | 1.9 | 40 |
| 1.0 | 12.0 | 1.9 | 40 |
| 0.5 | 3.0 | 1.4 | 20 |

Figure 6:
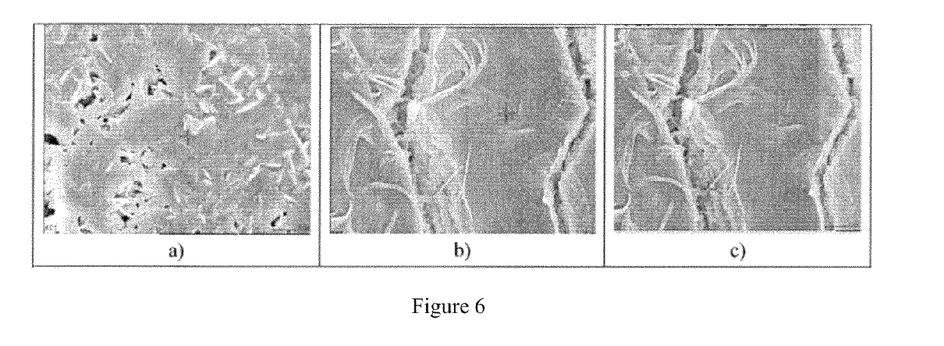
FIG. 6: SEM images showing spots were Energy-dispersive X-ray analysis was conducted for samples with 1.0 phosphoric acid solution to Fly ash ratio.

FIG. 6 shows SEM images of spots were Energy-dispersive X-ray analysis (EDAX) was conducted for samples with 1.0 phosphoric acid solution to Fly ash ratio. Table 4 shows EDAX results corresponding to the images shown in FIG. 6.

TABLE 4

EDAX results for images shown on FIG. 6.

| | Element wt % | | | | | | | | | | | | |
| --- | --- | --- | --- | --- | --- | --- | --- | --- | --- | --- | --- | --- | --- |
| | B | O | Na | Mg | Al | Si | P | Ti | Ca | V | Eu | Gd | Fe | Yb |
| FIG. 6a | 0.00 | 34.91 | 3.45 | 1.70 | 5.09 | 0.32 | 34.14 | 5.52 | 5.84 | 0.26 | 2.09 | 1.69 | 2.35 | 2.62 |
| FIG. 6b | 27.87 | 18.25 | 1.42 | 0.87 | 2.96 | 0.87 | 25.15 | 4.60 | 6.86 | 0.59 | 1.18 | 2.61 | 1.39 | 5.17 |
| FIG. 6c | 0.00 | 2.84 | 0.17 | 0.19 | 2.29 | 0.74 | 35.00 | 1.62 | 21.63 | 1.83 | 6.90 | 8.88 | 7.64 | 10.27 |

Figure 3:
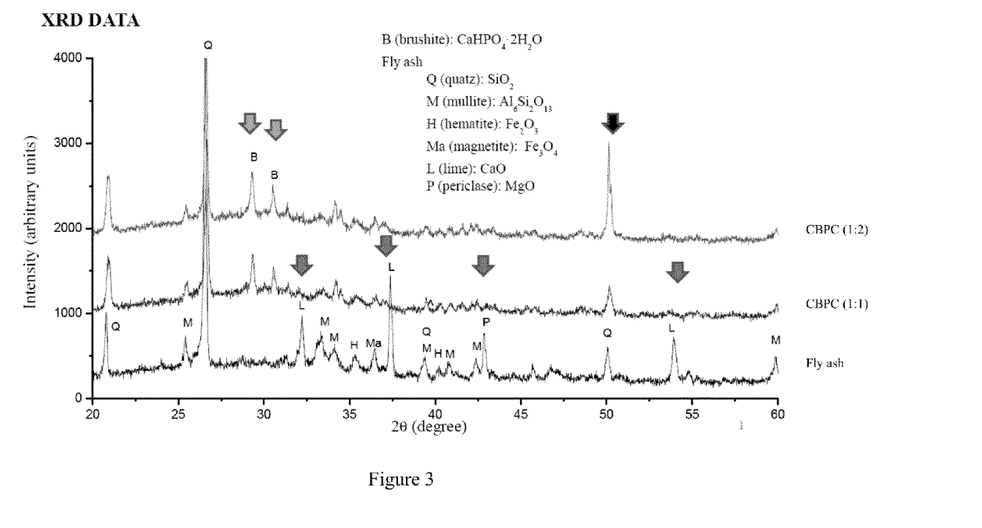
FIG. 3: X-ray Diffraction spectra for Fly ash and two different ceramics formed based on Fly ash. Acidic solution to Fly ash ratio is indicated.

XRD spectra presented in FIG. 3 show a new binding phase grown as a result of acid-base reaction. This phase corresponds to brushite (CaHPO$_4$.2H$_2$O), and is believed to result from reaction of lime (CaO) included in Fly ash and phosphoric acid.

Figure 4:
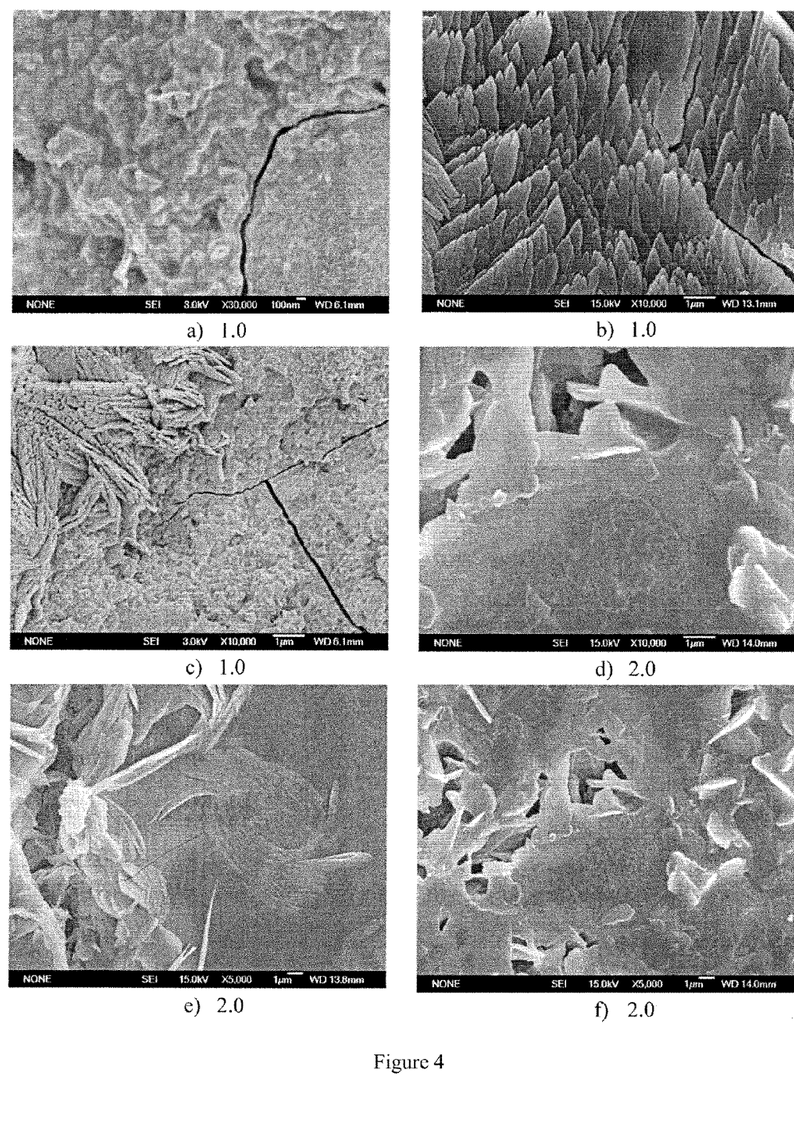
FIG. 4: SEM images showing glassy amorphous phases and crystalline phases grown during chemical reaction at low temperatures for ceramics based on Fly ash. Acidic solution to Fly ash ratio is indicated.

FIG. 4 shows SEM images for ceramics based on Fly ash. The images were obtained from fractured exposed surfaces or from as grown surfaces. FIGS. 4a, b, and c show images for samples with 1.0 phosphoric acid solution to Fly ash ratio. FIG. 4a shows a matrix, mainly including amorphous phases. Different grown crystalline phosphate phases appear as in FIGS. 4b and c. A more glassy material was obtained for 2.0 phosphoric acid solution to Fly ash ratio, as shown in FIGS. 4d, e, and f.

Figure 5:
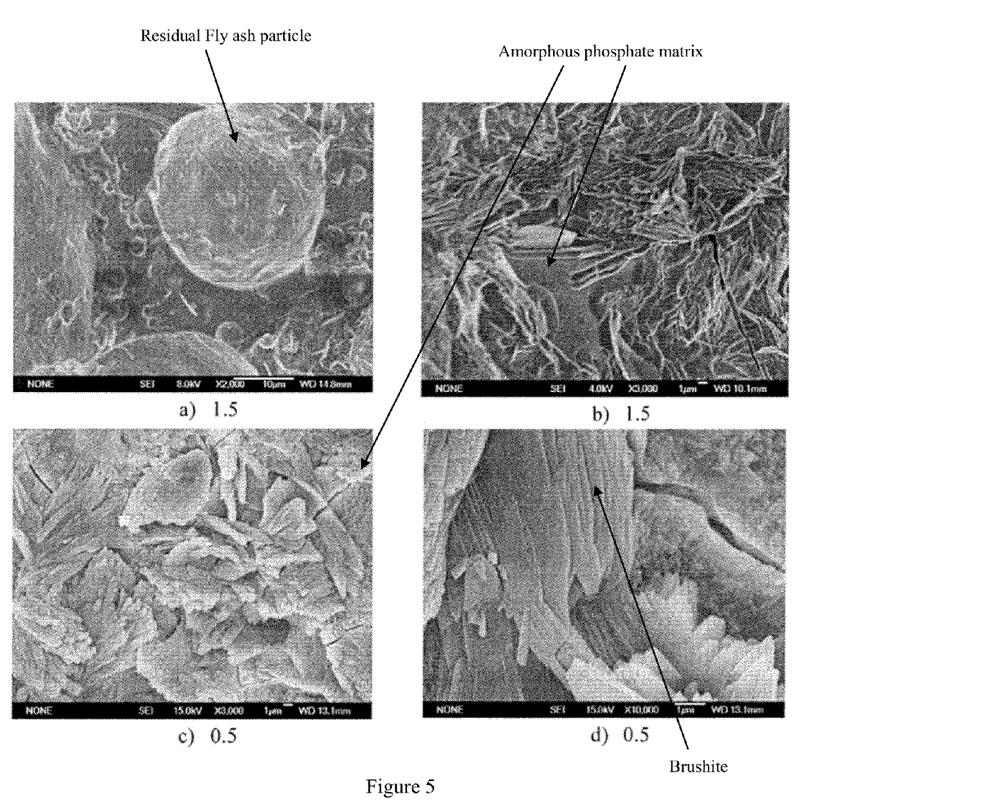
FIG. 5: SEM images showing glassy amorphous phases and crystalline phases grown during chemical reaction at low temperatures for ceramics based on Fly ash. Acidic solution to Fly ash ratio is indicated.

FIGS. 5a and b show SEM images for samples with 1.5 phosphoric acid solution to Fly ash ratio. FIG. 5a shows a residual Fly ash particle bonded to a ceramic matrix as the result of reaction with the phosphoric acid solution. FIG. 5b shows phosphates grown in the glazy material. FIGS. 5c and d show images for samples with 0.5 acidic solution to Fly ash ratios. This material includes more pores, and the matrix is not glazy, appearing like a traditional cement matrix.

When Wollastonite (CaSiO$_3$) is added as a reinforcement, an increase in compressive strength is observed. It is believed that this increase is associated with the role that calcium has in producing strong amorphous binding phases.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit and scope of the invention. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A manufacturing process of a chemically bonded ceramic, comprising:
    combining an acidic liquid and Fly ash to form a mixture, wherein the Fly ash corresponds to at least a majority by weight of solids combined with the acidic liquid to form the mixture; and
    curing the mixture to form the chemically bonded ceramic, wherein the Fly ash corresponds to at least 90% by weight of solids combined with the acidic liquid to form the mixture,
    wherein curing the mixture is carried out at a temperature up to 110° C., and
    wherein a compressive strength of the chemically bonded ceramic is at least 15 MPa,
    further comprising placing the mixture in a mold, and wherein curing the mixture is at least partially carried out with the mixture placed in the mold.

2. The manufacturing process of claim 1, wherein the Fly ash corresponds to at least 95% by weight of solids combined with the acidic liquid to form the mixture.

3. The manufacturing process of claim 1, wherein the acidic liquid and the Fly ash are combined in a weight ratio in a range of 0.25:1 to 2:1.

4. The manufacturing process of claim 1, wherein the acidic liquid corresponds to an aqueous phosphoric acid solution.

5. The manufacturing process of claim 1, wherein curing the mixture is carried out at the temperature of up to 50° C.

6. The manufacturing process of claim 1, wherein the compressive strength of the chemically bonded ceramic is at least 20 MPa.

7. The manufacturing process of claim 1, further comprising introducing borax in the mixture.

8. A manufacturing process of a chemically bonded ceramic, comprising:
    combining an acidic liquid and Fly ash to form a mixture, wherein the Fly ash corresponds to at least a majority by weight of solids combined with the acidic liquid to form the mixture; and
    curing the mixture to form the chemically bonded ceramic, wherein the Fly ash corresponds to at least 90% by weight of solids combined with the acidic liquid to form the mixture,
    wherein curing the mixture is carried out at a temperature up to 110° C., and
    wherein a compressive strength of the chemically bonded ceramic is at least 15 MPa, further comprising introducing Wollastonite in the mixture.

9. The manufacturing process of claim 8, wherein the Fly ash corresponds to at least 95% by weight of solids combined with the acidic liquid to form the mixture.

10. The manufacturing process of claim 8, wherein the acidic liquid and the Fly ash are combined in a weight ratio in a range of 0.25:1 to 2:1.

11. The manufacturing process of claim 8, wherein the acidic liquid corresponds to an aqueous phosphoric acid solution.

12. The manufacturing process of claim 8, wherein curing the mixture is carried out at the temperature of up to 50° C.

13. The manufacturing process of claim 8, wherein the compressive strength of the chemically bonded ceramic is at least 20 MPa.

* * * * *